Figure 3:
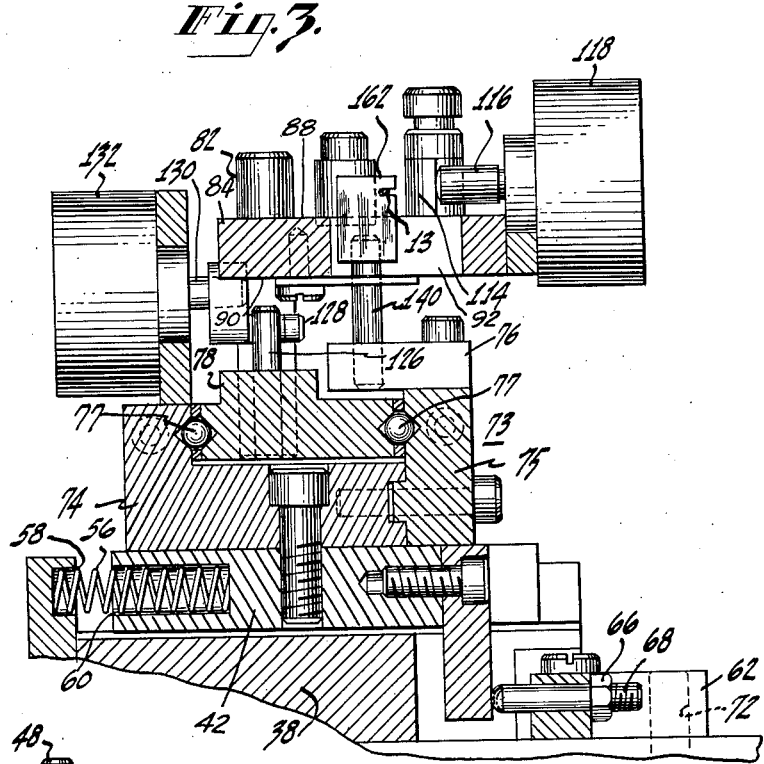

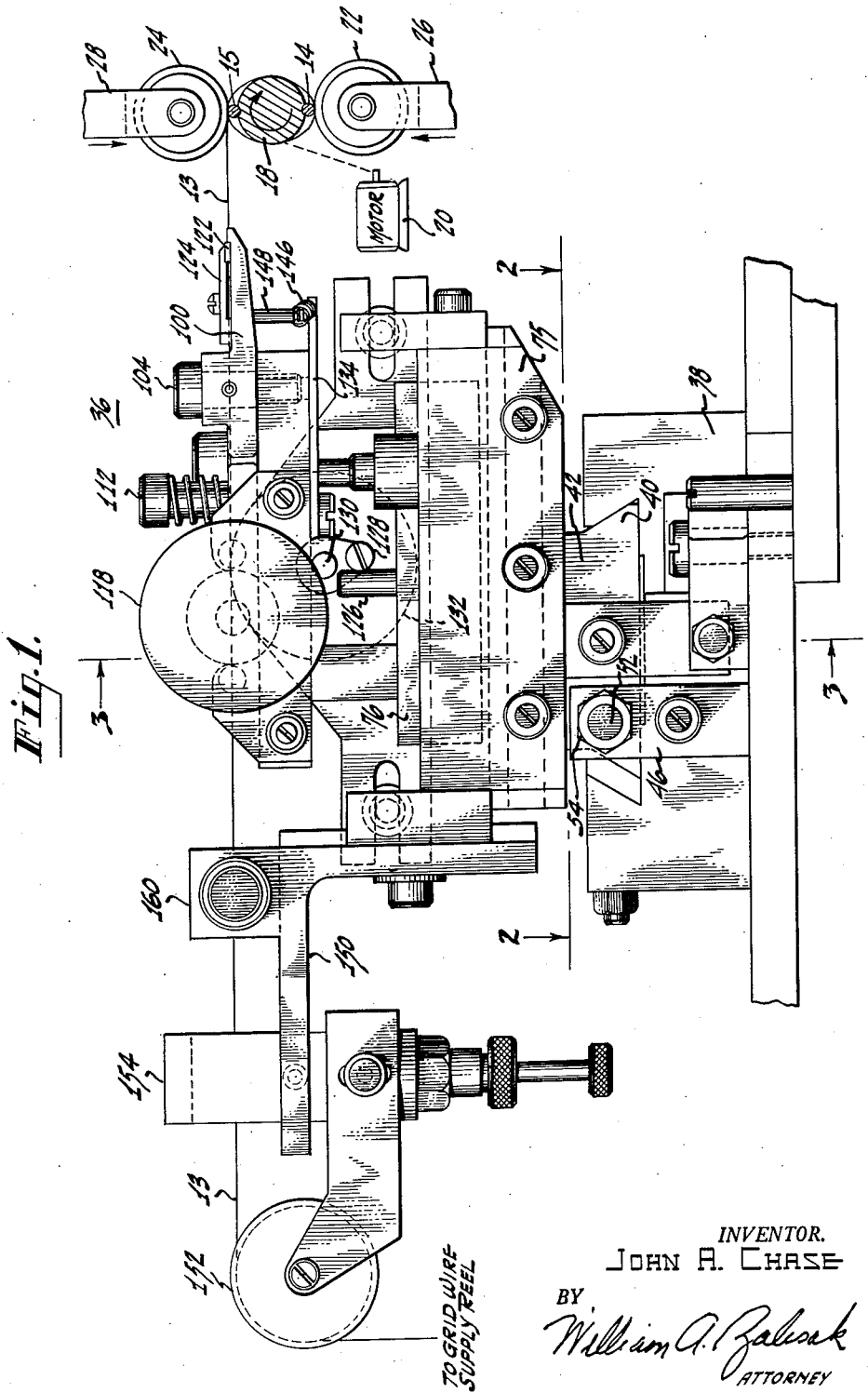

June 5, 1962    J. A. CHASE    3,037,533
APPARATUS FOR USE WITH AUTOMATIC GRID WINDING MACHINES
Filed Jan. 2, 1957    3 Sheets-Sheet 2

INVENTOR.
JOHN A. CHASE
BY
William A. Zalesak
ATTORNEY

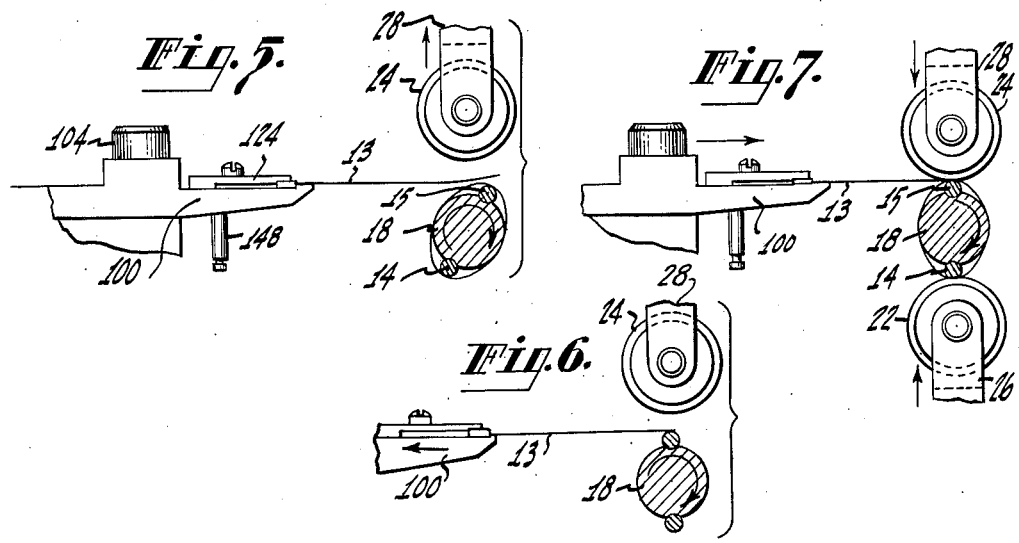
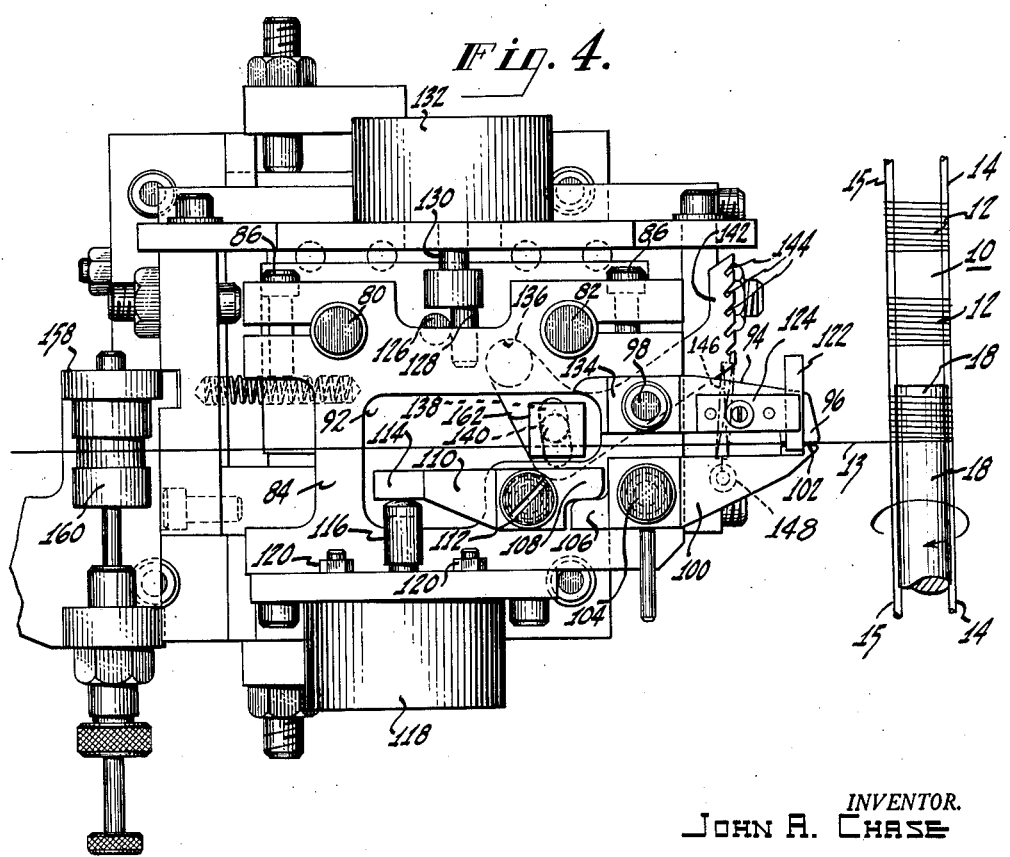

United States Patent Office 3,037,533
Patented June 5, 1962

3,037,533
APPARATUS FOR USE WITH AUTOMATIC
GRID WINDING MACHINES
John A. Chase, Nutley, N.J., assignor to Radio Corporation of America, a corporation of Delaware
Filed Jan. 2, 1957, Ser. No. 632,079
15 Claims. (Cl. 140—71.5)

This invention relates to apparatus for automatic grid winding machines and, particularly, to apparatus for controlling the feeding of grid lateral wire in such a machine.

One type of grid used in electron tubes comprises two spaced side support rods having fine grid lateral wire fixed thereto and extending thereacross in the form of a helix. Machines for automatically making this type of grid are known. One machine of this type includes a rotatable winding mandrel supporting the grid side rods adjacent to a winding head at which the turns of grid wires are wound on the side rods. Such a machine is adapted to wind a plurality of spaced groups of grid wires on relatively long lengths of side rods to form what is known as a grid strip which is cut into the individual grids.

One problem which presents itself in such grid making machines concerns the disposition of the grid lateral wire between groups of turns of the wire on the grid strip. Sometimes, turns of fine grid lateral wire are wound on the side rods between groups of turns. This is an undesirable method of operation since these turns are unnecessary and must later be removed either by hand or by suitable apparatus provided on the winding machine. The winding of the unnecessary turns is uneconomical, hand removal of these turns is inefficient, and known mechanical apparatus for performing this removal operation is undesirably complex.

Accordingly, the objects of this invention are directed toward the provision of improved apparatus for use with a grid winding machine which makes it possible to wind groups of turns of grid lateral wire on grid side rods to form a grid strip without winding turns of lateral wire between said groups of wires.

An apparatus incorporating the invention is adapted to be positioned in operative relation with the winding mandrel of a grid winding machine and includes means for gripping the fine grid lateral wire as it is being fed for winding on the side rods by the winding mandrel. The gripping means comprises a pair of cooperating gripping jaws which are mounted on a support plate which is arranged to be moved in a reciprocating manner with respect to the winding mandrel. During the winding operation, the gripping jaws are held together sufficiently to allow the grid lateral wire to pass between them. Means are provided for closing the gripping jaws to tightly grip the lateral wire during the winding of the last turn of a group of grid wires. When the lateral wire is thus gripped, continued rotation of the winding mandrel to complete the last turn causes the wire to break. During this phase of the operation, the fine grid wire is generally stretched a small amount. Means are provided for compensating for this stretching of the lateral wire by retracting the support plate and the gripping means carried thereby away from the winding mandrel a distance sufficient to reduce to a minimum a small tail of lateral wire remaining between a notching roller of the grid winding machine and the winding mandrel. The gripping jaws hold the retracted wire tail in position until it is peened into a notch in one of the side rods at the beginning of the winding of the next group of turns of grid wire.

Figure 2:
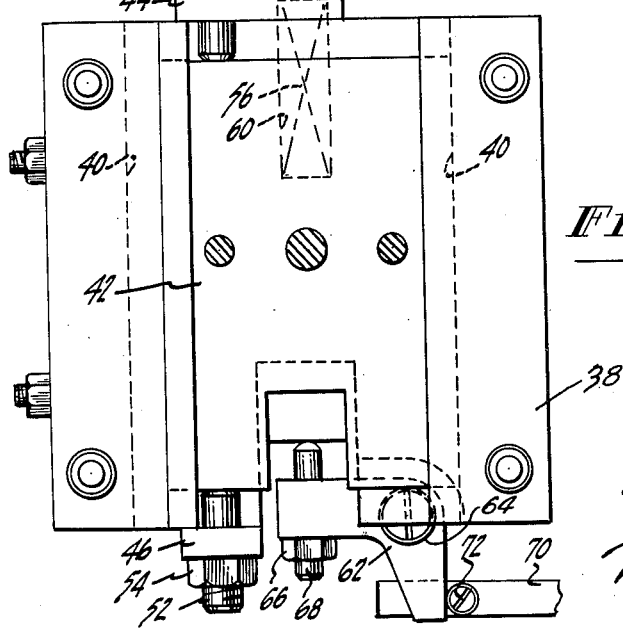

The invention is described in greater detail by reference to the drawing wherein:

FIG. 1 is an elevational view of apparatus embodying the invention mounted adjacent to a portion of a grid winding machine;

FIG. 2 is a sectional view along the line 2—2 in FIG. 1;
FIG. 3 is a sectional view along the line 3—3 in FIG. 1;
FIG. 4 is a plan view of the apparatus of FIG. 1;
FIG. 5 is an elevational view partly in section of a portion of the apparatus of FIG. 1 at a later time in the process of winding a grid;
FIG. 6 shows the apparatus of FIG. 5 at a still later time in the winding of a grid; and,
FIG. 7 shows the apparatus of FIG. 6 at the beginning of the process of winding a grid.

Apparatus embodying the invention is adapted to be operated with a grid winding machine which winds a grid strip 10 (FIG. 4) comprising a plurality of groups of turns 12 of fine grid lateral wire 13 on relatively long lengths of grid side rods 14 and 15. The grid strip 10 is later cut up, in any suitable way, to provide individual grids which are adapted to be mounted in electron tubes. One grid winding machine which winds a grid strip of this type is shown in U.S. Patent 2,719,543 of Maurer. This machine includes a winding mandrel 18 which is suitably coupled to a motor 20 by which it is rotated (FIG. 1). The grid side rods 14 and 15 are supported spaced apart on the mandrel 18 and rotate with the mandrel. The side rods are fed from suitable supply spools (not shown) and are drawn longitudinally past the mandrel by suitable apparatus (not shown).

A notching roller 22 and a peening roller 24 are mounted opposite each other adjacent to the winding mandrel 18 on suitable support assemblies 26 and 28 respectively, by means of which they may be moved into and out of operative relation with the side rods 14 and 15. The notching roller 22 is preferably positioned beneath the mandrel and the peening roller 24 is preferably positioned above the mandrel. The fine grid lateral wire 13 is fed between the peening roller 24 and the mandrel 18 and is peened into notches formed in the side rods by the notching roller. The lateral wire 13 is wound on the side rods as the mandrel rotates.

Apparatus 36 embodying the invention is mounted adjacent to the winding mandrel 18 and assists in the feeding of the lateral grid wire 13 between the peening roller 24 and the winding mandrel 18.

Means are provided for positioning the apparatus 36 longitudinally with respect to the winding mandrel. This means comprises a base plate 38 having a transverse dovetail slot 40 (FIG. 1) extending across the width thereof and in which a lateral slide block 42 is positioned. The slot 40 is oriented parallel to the axis of the winding mandrel 18. Stop blocks 44 and 46 are secured to opposite edges of the base plate 38. The block 44 carries an justable set screw 48 and lock nut 50 and the block 46 carries an adjustable set screw 52 and lock nut 54. The set screws 48 and 52 are employed to bear against the ends of the slide plate 42 in the dovetail slot 40 to orient the apparatus 36 in any desired longitudinal position with respect to the winding mandrel, when a uniformly wound grid is to be wound.

Means are also provided for continuously varying the position of the slide plate 42 in the slot 40, e.g. during the winding of a variable pitch grid. This means includes a compression spring 56 mounted in aligned slots 58 and 60 in the stop block 44 and slide plate 42, respectively. An L-shaped pusher arm 62 is pivotally mounted on the base plate 38 by a pin 64 and carries a lock nut 66 and adjustable set screw 68 which is adapted to bear against and move the slide plate 42 in the slot 40. An arm 70 operated by suitable means (not shown) carries a post 72 which engages and pushes the L-shaped arm 62. The said screws 48 and 52 must be properly set to permit such motion of the slide plate 42.

Means are also provided for positioning portions of the apparatus 36 transversely with respect to the winding mandrel 18. This means comprises a support member 73 (FIG. 3) including three portions 74, 75 and 76 secured together as a unitary assembly and fixed to the lateral slide block 42. The support member 73 is provided with a longitudinal ball race 77 in which a lower support plate 78 is slidably positioned. The ball race 77 is disposed transversely of the winding mandrel so that the lower support plate 78 may be moved toward and away from the winding mandrel for a purpose to be described. The lower support plate 78 carries a pair of vertical posts 80 and 82 to which an upper support plate 84, spaced from the lower plate, is secured by means of bolts 86. The upper support plate 84 has upper and lower parallel surfaces 88 and 90 and is provided with an aperture 92 through which other portions of the apparatus 36 extend in a manner to be described below.

The apparatus 36 includes means for gripping the grid lateral wire and means for actuating the gripping means to gripping position. These means (FIG. 4) include a first gripping member 94 fixed against rotation and having a gripping jaw 96. This member is fixed to the upper surface 88 of the upper support plate 84, by means of a bolt 98. A second gripping member 100 having a gripping jaw 102 spaced from and facing the gripping jaw 96 of the first gripping member 94 is pivotally mounted on the upper surface of the upper support plate by means of a pin 104. The second gripping member 100 has a rearwardly projecting leg 106 which engages a forwardly projecting leg 108 of an actuating pusher arm 110 pivotally mounted on the upper surface 88 of the upper support plate 84 by means of a pin 112. The pusher arm 110 has a rearwardly projecting leg 114 which engages an armature 116 of a conventional plunger solenoid 118 suitably secured to the upper plate 84 by means of bolts 120. A thin metal strap 122 is secured to the top surface of fixed gripping member 94 by a plate 124 and extends across the member 100 to maintain the gripping jaws of the two gripping members in the same horizontal plane.

Means are provided for retracting the assembly of upper and lower support plates 84 and 78 from an operative position adjacent to the winding mandrel 18. This is done by sliding the lower plate in the ball race 77 transversely away from the mandrel 18. To cause this sliding action, a vertical post 126 is provided (FIGS. 3 and 4) which is secured to the lower support plate 78 and extends toward but terminates short of the upper support plate 84. The post 126 engages an arm 128 which is secured to an armature 130 of a conventional rotary solenoid 132 which is suitably secured to the support member 73.

Means are provided for performing the double function of properly compressing to a small degree the gripping members 94 and 100 in a released position while the grid lateral wire passes between them and driving the upper and lower support plates 84 and 78 forwardly from their retracted position to an operative position adjacent to the winding mandrel 18. This means (FIGS. 3 and 4) includes a tension arm 134 pivotally secured to the lower surface 90 of the upper support plate 84 by means of a pin 136 positioned at a point between the ends of the upper support plate. The tension arm 134 is provided with a slot 138 which receives a post 140 secured to the support member 73. The tension arm 134 extends from its point of attachment to the upper support plate and terminates in an end 142 which lies adjacent to the gripping member 94. The end 142 of the tension arm is provided with a plurality of slots 144, and a tension spring 146 is suitably secured between one of the slots and a post 148 secured to the movable gripping member 100 (FIG. 1). The spring 146 is employed to maintain a minimum closure pressure between the gripping members 94 and 100 during a grid winding cycle. In addition, the spring 146 serves to return the assembly of upper and lower support plates from its retracted to its forward position in a manner to be described.

Means are provided for guiding the lateral grid wire 13 through the apparatus 36 to the winding mandrel 18. This means includes a rearwardly extending platform 150 (FIG. 1) secured to the support member 73 and on which are mounted a wire guide wheel 152 (FIG. 1) and a guide assembly 154 carrying a pair of felt pads or the like (not shown) between which the lateral wire 13 passes. The felt pads serve to clean and lubricate the wire 13. Guide means for applying tension to the lateral wire 13 is mounted on the platform 150 ahead of the guide assembly 154 and includes a stationary member 158 (FIG. 4) and an adjustable member 160 between which the lateral wire passes. A nylon guide member 162 (FIG. 3) is mounted on the post 140 and extends through the aperture 92 in the upper support plate 84. The various wire guide members are mounted substantially in axial alignment.

In operation of the apparatus, the grid lateral wire 13 is taken from a suitable reel (not shown) and is threaded over the guide wheel 152 and through the guide and tensioning members 154, 158 and 160 and finally between the gripping jaws 96 and 102 of the gripping members 94 and 100, respectively. Assume that the winding mandrel 18 and side rods 14 and 15 are rotating and the lateral wire 13 is being wound around the side rods. When the desired number of turns of wire have been wound and the peening roller 24 has just peened the last turn into its notch (FIG. 1), the solenoid 118 is energized and its armature 116 is extended axially from the solenoid to drive the pusher arm 110 clockwise (FIG. 4). The pivotable gripping member 100 is thereby rotated counter-clockwise sufficiently to close the jaws of the gripping members 94 and 100 tightly with the lateral wire 13 between them. With the lateral wire thus prevented from being fed to the winding mandrel 18, continued rotation of the mandrel through about 45° (FIG. 5) causes the lateral wire to break. This break occurs in the region of the peen of the last turn as a result of the weakening of the wire in this region due to the deformation produced by the peening operation.

As the winding mandrel 18 turns through the arc necessary to break the wire 13, the wire stretches and, when the break occurs, a comparatively long tail of wire extends between the peening roller 24 and the mandrel 18 as shown in FIG. 5. If on the winding of the next group of turns of lateral wire such a long tail were allowed to project from one of the side rods, the resulting grid would be unsatisfactory for use in a tube. Accordingly, with the solenoid 118 energized and the gripping members 94 and 100 tightrtly gripping the lateral wire 13, the solenoid 132 is energized and its armature 130 which engages the vertical post 126 drives the assembly of upper and lower support plates 84 and 78 rearwardly and away from its operative position adjacent to the winding mandrel. The distance that the support plates 84 and 78 are retracted is enough to compensate for the amount which the lateral wire is stretched during the breaking operation. Thus, when the assembly has been retracted, a minimum length of the free end portion of the lateral wire 13 lies between the peening roller and the mandrel (FIG. 6).

During the retraction of the assembly of upper and lower support plates 84 and 78, the gripping members 94 and 100 remain closed so that the lateral wire follows the retracted movement of the assembly. During this movement, the post 140 which rides in the slot 138 in the tension arm 134 causes the tension arm to rotate counter-clockwise (FIG. 4) so that the spring 146 is put under tension. As shown in FIGS. 6 and 7, the end of the stretched lateral wire 13 will bear against the notched side rods 14 and 15 as the mandrel rotates to bring the side rods adjacent the lateral wire 13. Thus, the end of the stretched lateral wire 13 will fall into successive notches in the side rods 14 and 15. After the mandrel 18 has been advanced a predetermined distance and the machine is ready to wind the next grid, the peening roller 24 comes down and fastens the free end portion of the lateral wire into a notch in the side rod into which it has fallen. The solenoid 118 is deenergized to release the gripping members 94 and 100 and another winding operation is begun. At this time, the solenoid 132 is deenergized and the spring 146, due to its stretched conditioned by virtue of the earlier counter-clockwise rotation of the tension arm 134, rotates the tension arm 134 back in a clockwise direction and drives the assembly of upper and lower support plates 84 and 78 from its retracted position to its forward position (FIG. 7) where it remains until the next breaking operation. The lessened force supplied by the tension spring 146 at this point is such that the grid lateral wire 13 passes freely between the gripping members 94 and 100 and the next group of grid turns is wound.

What is claimed is:

1. A grid winding apparatus comprising a plate movable between a retracted and a winding position, a wire gripping mechanism having two jaw members, one of said jaw members being fixed to said plate, the other of said jaw members being pivotally mounted on said plate, a first means connected to said other of said jaw members for urging said jaw members together for gripping a wire with a relatively small restraining force, and a second means connected to said first means for both increasing the restraining force of said members and returning said plate from retracted position to a grid winding position.

2. A grid winding apparatus comprising a movable plate, a wire gripping mechanism having two jaw members, one of said jaw members being fixed to said plate, the other of said jaw members being pivotally mounted on said plate, spring means connected to said other of said jaw members for urging said jaw members together for gripping a wire with a relatively small restraining force, means for moving said plate to a retracted position, and lever means connected to said spring means for returning said plate to a grid winding position from said retracted position.

3. A grid winding apparatus comprising two relatively movable jaw members, a first means including a lever for urging said jaws together about a lateral wire with a first force to permit travel of said lateral wire through said jaw members, a second means connected to one of said jaw members for urging said members together with a second force for restraining movement of said lateral wire through said jaw members in response to a third force sufficient to break said lateral wire, and a third means connected to said lever for urging said jaws together with a fourth force.

4. A grid winding apparatus comprising two relatively movable jaw members, a first means including a slotted first lever for urging said jaws together about a lateral wire with a first force to permit travel of said lateral wire through said jaw members, a second means including a second lever independently operable of said first lever and connected to one of said jaw members for urging said jaw members together with a second force for preventing movement of said lateral wire through said jaw members against a third force of tension in said lateral wire sufficient to break said lateral wire, and a third means including a pin slidably engaging said slot in said first lever for effecting the urging of said jaws together with a fourth force, said third means being adapted to effect a translational movement of both said jaw members.

5. A grid winding apparatus comprising an elongated mandrel adapted to support a grid side rod; wire handling means spaced laterally from said mandrel and adapted to guide a wire toward said mandrel; means for rotating said mandrel to wind said wire thereabout and thereby pull said wire through said wire handling means; said wire handling means including jaw members and a locking mechanism for clamping said jaw members about said wire to restrain movement thereof, whereby said lateral wire is stretched and broken on continued rotation of said mandrel; and a power transfer mechanism connected to said jaw members for retracting the same while said jaw members are clamped to compensate for the stretching of said lateral wire.

6. A grid winding apparatus comprising an elongated mandrel adapted to securely support a grid side rod; peening means adjacent to said mandrel; lateral grid wire handling mechanism spaced laterally from said mandrel and adapted to guide a lateral wire between said mandrel and said peening means; means for rotating said mandrel to wind said lateral wire thereabout and thereby pull said lateral wire through said wire handling means; said peening means being adapted to deform and interlock a first portion of said lateral with said side rod; said wire handling mechanism including means adapted to engage and restrain movement of said lateral wire whereby a second portion of said lateral wire between said first portion and said engaging means is stretched and said lateral wire is broken adjacent said first portion on continued rotation of said mandrel; and means for moving said engaging means away from said mandrel to compensate for the stretching of said second portion of said lateral wire.

7. A grid winding apparatus comprising an elongated mandrel; means for axially rotating said mandrel; said mandrel having opposite sides adapted to engage two grid side rods; peening means adjacent to said side rods and adapted to secure a lateral wire to said side rods; and a lateral wire feed mechanism positioned laterally of said mandrel and adapted to feed said lateral wire between said peening means and said mandrel and into engagement successively with said side rods, lateral wire gripping means operable in synchronism with said rotating means for restraining feed of said lateral wire immediately after said lateral wire is secured to one of said side rods, whereby said lateral wire between said gripping means and said one of said side rods is stretched and said wire is broken adjacent to said one of said side rods, and means connected to said gripping means for moving said gripping means away from said mandrel while said feed of lateral wire is restrained to compensate for the stretching of said lateral wire and to dispose the broken end of the lateral wire adjacent to a side rod for winding additional lateral wire thereon.

8. The method of making wire wound grids comprising the steps of: disposing grid side rod stock axially along an elongated mandrel; feeding lateral grip winding wire through a pair of closable jaws to said mandrel, said closable jaws having a predetermined location relative to said mandrel; attaching the end of said lateral grid winding wire to said side rod stock; rotating said mandrel relative to said closable jaws to pull said lateral grid winding wire through said jaws and wind said lateral grid winding wire about said side rod stock and said mandrel in a predetermined number of helices; gripping said lateral grid winding wire with said closable jaws to restrain feed thereof through said jaws toward said mandrel; continuing said rotation of said mandrel to stretch and break said lateral grid winding wire at a point between said mandrel and said closable jaws; while maintaining said jaws clamped about said wire moving said jaws away from said mandrel a distance sufficient to bring the broken end of said unwound stretched lateral grid winding wire adjacent to a predetermined point with respect to said mandrel; axially advancing said grid side rod stock a predetermined distance; attaching said end of said unwound stretched grid winding wire to said side rod stock; and returning said closable jaws to said predetermined location for the beginning of a successive grid winding operation.

9. Apparatus for fabricating wire-wound grids comprising elongated grid-suport means, means for laying down a grid side-rod wire along said grid-support means, grid lateral wire handling means adjacent said grid support means for holding a grid lateral wire adjacent a side rod, means for rotating said grid-support means, and means for securing a grid lateral wire to said side-rod wire on said grid-support means, said grid lateral wire handling means including means for gripping a lateral wire to sever the grid lateral wire at a side rod on continued rotation of said grid support means and means for moving said gripping means and said grid-support means away from each other to position the severed end of said grid lateral wire in registry with the side rod to be secured thereto by said securing means.

10. Apparatus for fabricating wire-wound grids comprising an elongated grid-supporting mandrel, means for placing a grid side-rod wire longitudinally along said mandrel, grid lateral wire handling means spaced laterally from said mandrel for guiding a grid lateral wire toward said mandrel, notching and peening means for securing said grid lateral wire to said side rod wire on said mandrel, and means for rotating said mandrel to wind said lateral wire about said mandrel and thereby pull said lateral wire through said lateral wire handling means, said lateral wire handling means including a pair of gripper members closable upon said lateral wire for restraining movement thereof through said lateral wire handling means against a continued rotation of said mandrel to stretch and break said lateral wire between said mandrel and said gripper members and means for moving said gripper members away from said mandrel a distance substantially equal to the stretching of said lateral wire.

11. Apparatus for fabricating wire wound grids comprising, an elongated grid-support means, means for laying down at least one grid side rod longitudinally along said grid support means, means for notching said side rod at longitudinally spaced intervals therealong, wire handling means for guiding a grid lateral wire into one of said notches, peening means for securing said lateral wire within said notch, and means for rotating said grid-support means to wind said lateral wire thereabout and about said side-rod to pull said lateral wire through said wire handling means, said wire handling means including means for gripping said lateral wire to restrain passage therethrough and effect a stretching and breaking of said lateral wire between said grid support means and said gripping means in response to a continued rotation of said grid support means, and power transfer means to move said gripping means and said grid-support means apart to bring the end of said stretched wire held in said gripping means to adjacent a predetermined point with respect to said grid-support means.

12. Apparatus for fabricating wire wound grids comprising a rotatable mandrel for supporting grid side rod wires fed longitudinaly to said grid, grid lateral wire handling means adjacent said mandrel for holding a grid lateral wire adjacent a side rod, means for securing the grid lateral wire to a side rod wire, said grid lateral wire handling means including means for gripping a lateral wire to sever the grid lateral wire at its side rod on continued rotation of said grid support means, and means for causing relative movement of said gripping means and mandrel away from each other to position the severed end of the grid lateral wire in registry with a side rod, and means for causing said securing means to secure the severed end of the lateral wire to a side rod at an interval along said side rod greater than the distance between adjacent turns of the grid lateral wires to form a successive grid.

13. Apparatus for winding spaced grids on side rods including a rotatable mandrel for supporting side rods fed longitudinally thereof, a grid lateral wire feeding and supporting means adjacent said mandrel and adapted to support a grid lateral wire adjacent a side rod on said mandrel, means co-operating with said mandrel for securing a grid lateral wire to a side rod to initiate the formation of a grid, means for gripping said grid lateral wire after a predetermined number of turns of said mandrel to sever said lateral wire at a side rod on continued rotation of the mandrel, means for causing relative movement between said mandrel and grid lateral wire feeding means to position the severed end of the grid lateral wire adjacent a side rod, and means for causing said grid lateral wire securing means to fix the severed end of the lateral wire to a side rod to initiate the winding of a successive grid a predetermined number of turns after said lateral wire has been severed.

14. The method of making wire-wound grids comprising the steps of: pulling a wire past a wire gripping station to a wire winding station spaced from said gripping station by winding said wire into a helical grid; gripping said wire at said gripping station to prevent passage of said wire therepast; continuing the winding of said wire at said winding station to stretch and break said wire between said gripping and winding stations; and while maintaining said wire gripped at said gripping station, moving said gripping and winding stations further apart from each other by an amount commensurate with said wire stretching.

15. The method of making wire-wound grids comprising the steps of: pulling a wire through a pair of grippers to a rotating mandrel by winding said wire around said mandrel, gripping said wire with said grippers to prevent passage of said wire therethrough, continuing the wire-winding rotation of said mandrel to stretch and break said wire between said mandrel and said grippers, retracting the stretched wire held in said grippers away from said mandrel a distance sufficient to bring the free end thereof to adjacent said mandrel, and fixing said stretched wire with respect to said mandrel to begin another grid winding action.

References Cited in the file of this patent

UNITED STATES PATENTS

| | | |
|---|---|---|
| 1,807,892 | Brindle | June 2, 1931 |
| 1,925,884 | Steele | Sept. 5, 1933 |
| 1,947,449 | Anderson | Feb. 20, 1934 |
| 2,171,225 | Schade | Aug. 29, 1939 |
| 2,327,033 | Flaws | Aug. 17, 1943 |
| 2,441,228 | Schneider et al. | May 11, 1948 |
| 2,480,677 | Sheffield | Aug. 30, 1949 |
| 2,648,797 | Werner | Aug. 11, 1953 |
| 2,650,634 | Young et al. | Sept. 1, 1953 |
| 2,759,499 | Gartner | Aug. 21, 1956 |
| 2,798,514 | Mullan | July 9, 1957 |
| 2,836,287 | Cady | May 27, 1958 |
| 2,877,806 | Moehler | Mar. 17, 1959 |